United States Patent
Chatterjee et al.

(10) Patent No.: US 11,361,050 B2
(45) Date of Patent: Jun. 14, 2022

(54) ASSIGNING DEPENDENT MATRIX-VECTOR MULTIPLICATION OPERATIONS TO CONSECUTIVE CROSSBARS OF A DOT PRODUCT ENGINE

(71) Applicant: Hewlett Packard Enterprise Development LP, Houston, TX (US)

(72) Inventors: Soumitra Chatterjee, Bangalore (IN); Sunil Vishwanathpur Lakshminarasimha, Bangalore (IN); Mohan Parthasarathy, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 692 days.

(21) Appl. No.: 16/196,423

(22) Filed: Nov. 20, 2018

(65) Prior Publication Data

US 2020/0159811 A1 May 21, 2020

(51) Int. Cl.
*G06F 17/16* (2006.01)
*G06N 3/10* (2006.01)
*G06F 8/41* (2018.01)

(52) U.S. Cl.
CPC ............... *G06F 17/16* (2013.01); *G06F 8/41* (2013.01); *G06N 3/10* (2013.01)

(58) Field of Classification Search
CPC .. G06F 17/16; G06F 8/41; G06N 3/10; G06N 3/0635
USPC ........................................................ 708/607
See application file for complete search history.

(56) References Cited

U.S. PATENT DOCUMENTS

| 9,710,265 | B1 | 7/2017 | Temam |
| 9,818,059 | B1 | 11/2017 | Woo |
| 2018/0095930 | A1 | 4/2018 | Lu |
| 2018/0114569 | A1 | 4/2018 | Strachan |
| 2018/0314249 | A1* | 11/2018 | Appu .................... G06F 9/5061 |
| 2020/0159810 | A1* | 5/2020 | Ghosh ................... G06F 9/3001 |

OTHER PUBLICATIONS

Sparsh Mittal, "A Survey of ReRAM-based Architectures for Processing-in-memory and Neural Networks," Mar. 15, 2018.
Hu, et al., "Dot-Product Engine for Neuromorphic Computing: Programming 1T1M Crossbar to Accelerate Matrix-Vector Multiplication", Hewlett Packard Labs, HPE-2016-23, 7 pages.
John Paul Strachan, "The Dot-Product Engine (DPE): exploring high efficiency analog multiplication with memristor arrays" Hewlett Packard Labs, Dec. 11, 2015, 29 pages.

(Continued)

*Primary Examiner* — Tan V Mai
(74) *Attorney, Agent, or Firm* — Brooks, Cameron & Huebsch, PLLC (57) ABSTRACT

Example implementations relate to assigning dependent matrix-vector multiplication (MVM) operations to consecutive crossbars of a dot product engine (DPE). A method can comprise grouping a first MVM operation of a computation graph with a second MVM operation of the computation graph where the first MVM operation is dependent on a result of the second MVM operation, assigning a first crossbar of a DPE to an operand of the first MVM operation, and assigning a second crossbar of the DPE to an operand of the second MVM operation, wherein the first and second crossbars are consecutive.

20 Claims, 8 Drawing Sheets

(56) References Cited

OTHER PUBLICATIONS

Sato et al., "An in-depth look at Google's first Tensor Processing Unit (TPU)", available online at <https://cloud.google.com/blog/products/gcp/an-in-depth-look-at-googles-first-tensor-processing-unit-tpu>, May 12, 2017, 19 pages.
Wikipedia, "Application Specific Integrated Circuit", available online at <https://en.wikipedia.org/w/index.php?title=Application-specific_integrated_circuit&oldid=869448424>, Nov. 18, 2018, 6 pages.
Wikipedia, "Artificial Intelligence", available online at <https://en.wikipedia.org/w/index.php?title=Artificial_intelligence&oldid=868412272>, Nov. 12, 2018, 58 pages.
Wikipedia, "Deep Learning", available online at <https://en.wikipedia.org/w/index.php?title=Deep_learning&oldid=868612919>, Nov. 13, 2018, 26 pages.
Wikipedia, "Graphics Processing Unit", available online at <https://en.wikipedia.org/w/index.php?title=Graphics_processing_unit&oldid=869383666>, Nov. 18, 2018, 16 pages.
Wikipedia, "Machine Learning", available online at <https://en.wikipedia.org/w/index.php?title=Machine_learning&oldid=867696073>, Nov. 7, 2018, 15 pages.

* cited by examiner

ASSIGNING DEPENDENT MATRIX-VECTOR MULTIPLICATION OPERATIONS TO CONSECUTIVE CROSSBARS OF A DOT PRODUCT ENGINE

BACKGROUND

Neural networks may be implemented on a dot product engine (DPE). A DPE may perform matrix-vector multiplication (MVM) operations that consume large quantities of memory and computational resources.

DETAILED DESCRIPTION

With the advent of Artificial Intelligence (AI), Machine Learning (ML), and Deep Learning (DL) applications, specialized processors for these applications have been developed to support the massive compute requirements of these applications. Existing general-purpose processors, such as central processing units (CPUs), may not scale well for AI/ML/DL applications. Graphics processing units (GPUs) can support AI/ML/DL applications; however, GPUs may have larger form factors, consume a lot of power, and be expensive such that GPUs may not be optimally designed for AI/ML/DL applications.

Accelerators, including application specific integrated circuits (ASICs) such as tensor processing units (TPUs), have been developed to cater to the growing demands of the AI/ML/DL ecosystem. A DPE is a high-density, power efficient accelerator that utilizes the current accumulation feature of a memristor crossbar. A DPE, together with a fast conversion algorithm, can accelerate performance of MVM operations in robust applications that do not use high computing accuracy such as neural networks. This approach to performing MVM operations in the analog domain can be orders of magnitude more efficient than digital ASIC approaches, especially increased crossbar array sizes. In contrast to previous highly parallel architectures where each compute component (e.g., core) executes the same set of instructions in parallel, such as a GPU, each compute component (e.g., core) of a DPE can execute a separate set of instructions independent of and in parallel with other compute components of the DPE. This can enable a DPE to schedule subgraphs of a computation graph of a neural network to be executed in parallel to improve efficiency of performing MVM operations of the computation graph.

The performance of a neural network may depend largely on the partitioning of a computation graph of the neural network and the scheduling of MVM operations across highly parallel compute units. Co-location of weight matrices and MVM operations perform thereon may be critically important to ensure minimal data transfer overheads across the compute units. Optimal partitioning of the compute graph can ensure maximal parallel execution of non-dependent MVM operations.

A software development environment can be used to develop neural network models, to be implemented on the DPE architecture, that take advantage of the parallel crossbars of the DPE architecture for performing MVM operations. The software development environment can use a domain specific programming language (DSL) and include a compiler (e.g., a DPE DSL compiler) that compiles the DSL into a DPE binary format and a loader that transfers data, including supporting libraries, and instructions to the DPE. A DSL can be defined by a set of data structures and application program interfaces (APIs). A non-limiting example of a DSL is C++ that is standardized by the International Organization for Standardization (ISO C++). The data structures and APIs can be building blocks of neural network algorithms implemented on a DPE. A DSL can provide a set of computing elements, which may be referred to as tensors, and operations defined over the tensors. Tensors can include constructs such as scalars, arrays, vectors, and matrices. As used herein, "scalars" refer to singular values, "vectors" refer to one-dimensional sets of elements or values, and "matrices" refer to two-dimensional sets of elements or values. Arrays and matrices can have large dimensions (e.g., hundreds of rows and/or columns) and include complex values.

A DPE can have a development environment that takes advantage of the highly parallel matrix-vector multiplication capabilities of the DPE. To improve performance of neural networks on the DPE architecture, a compiler toolchain can implement optimizations that take advantage of the characteristics of the DPE hardware. For example, weight matrices can be loaded across the crossbars of a DPE to minimize data movement and maximize co-location. The disclosure describes approaches that can be implemented via a DPE DSL compiler to help develop highly efficient neural network models targeted for the DPE architecture through optimal placement of weight matrices on the DPE crossbars.

A DPE can use examples of a compiler toolchain disclosed herein that take advantage of the architecture of a DPE. The disclosure describes approaches that can be implemented with a DPE DSL compiler for time and/or energy efficient code through assignment of weight matrices of a neural network on crossbars of a DPE. Examples disclosed herein can include partitioning a computation graph of a neural network into a plurality of subgraphs based on dependencies of MVM operations of the computation graph. Examples disclosed herein can include assigning MVM operations to crossbars of a DPE based on the grouping of MVM operations of a computation graph of a neural network. Examples disclosed herein can include propagating affinities throughout a computation graph of a neural network based on assignment of MVM operations to crossbars of a DPE.

Figure 1:
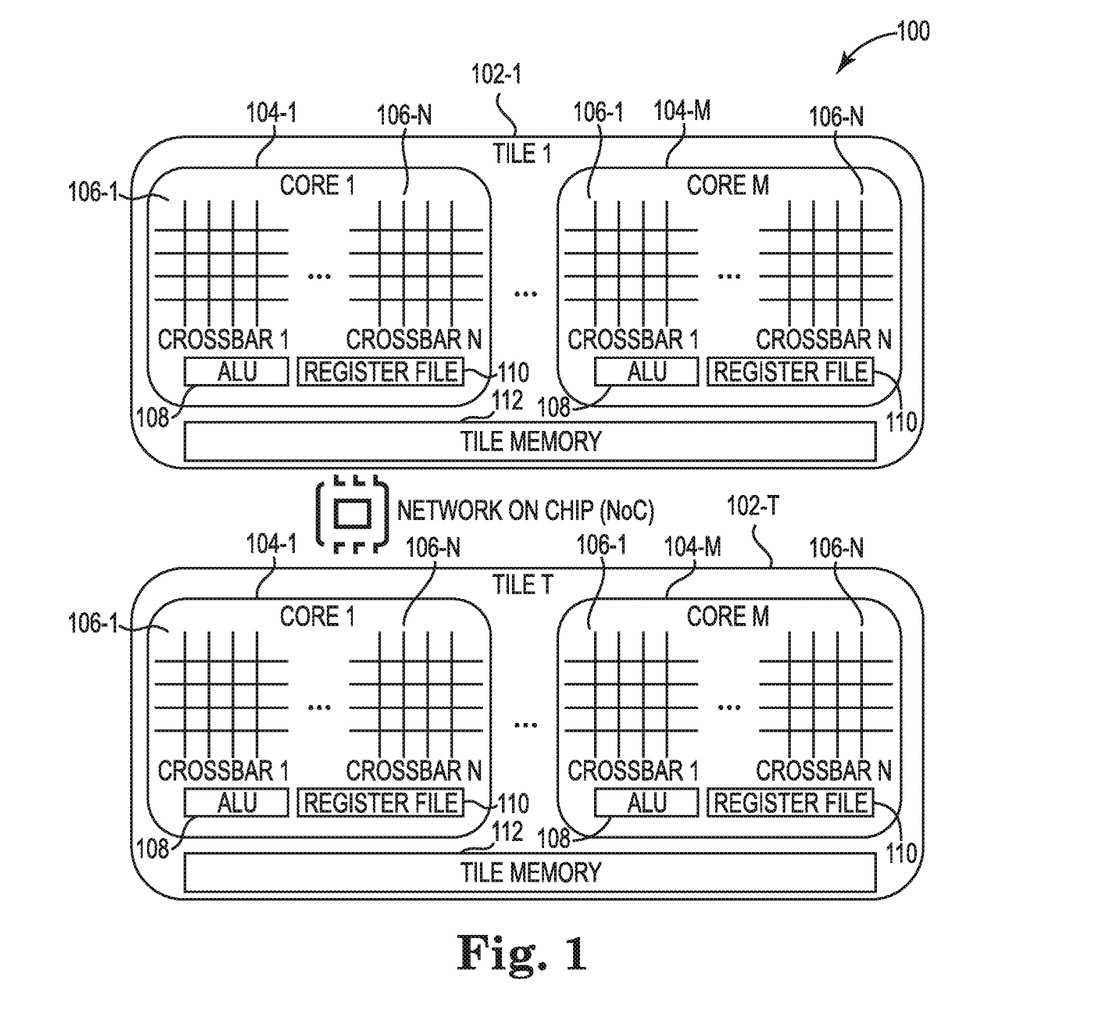
FIG. 1 illustrates an example DPE consistent with the disclosure.

FIG. 1 illustrates an example DPE 100 consistent with the disclosure. The DPE 100 can be a Network on Chip (NoC). The DPE 100 includes a plurality of tiles 102-1 . . . 102-T (collectively referred to as the tiles 102). Each respective one of the tiles 102 can include a plurality of cores 104-1 . . . 102-M (collectively referred to as the cores 104) and memory 112. Each respective one of the cores 104 can include a plurality of crossbars 106-1 . . . 106-N (collectively referred to as the crossbars 106), an algorithmic logic unit (ALU) 108, and a register file 110. Each respective one of the cores 104 has its own memory, but the memory 112 of each respective one of the tiles 102 is larger. A crossbar may be referred to as a matrix-vector multiplication unit (MVMU) that performs MVM operations in an analog domain. As described herein, a weight matrix can be assigned to and loaded onto each respective one of the crossbars 106 of the DPE 100 according to the partitioning of a computation graph of a neural network into groups based on the dependencies of MVM operations of the computation graph.

Figure 2:
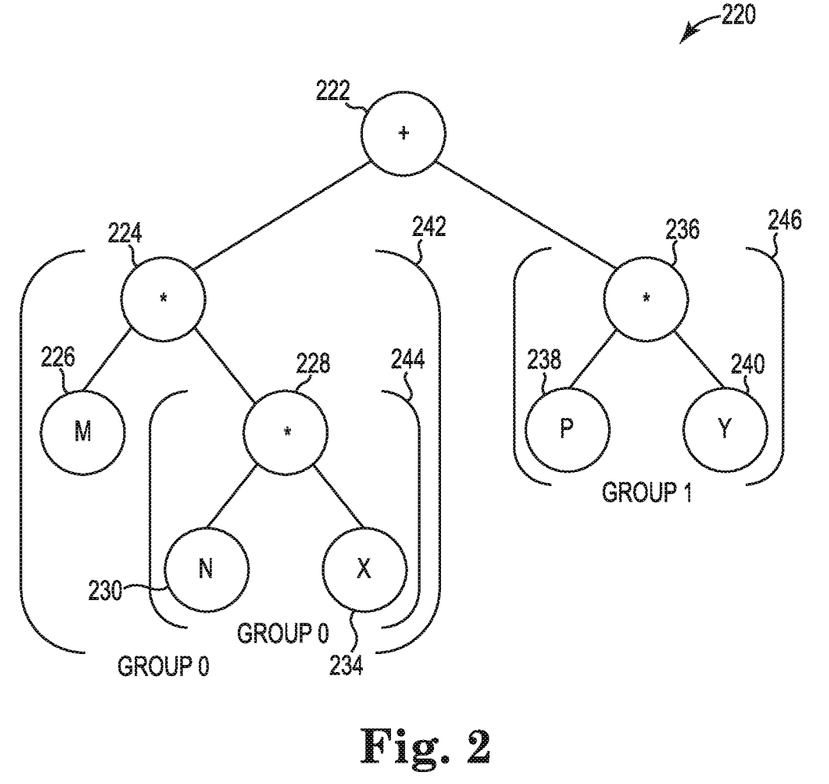
FIG. 2 illustrates example grouping of MVM operations of a computation graph consistent with the disclosure.

FIG. 2 illustrates example grouping of MVM operations of a computation graph 220 consistent with the disclosure. The computation graph 220 represents the following expression: (M+(N*X))+(P*Y). As shown in FIG. 2, inputs M, N, P, X, and Y are represented by the nodes 226, 230, 234, 238, and 240. M, N, and P can each be a weight matrix and X and Y can each be a vector. The following is an example of a program developed using a DPE DSL to describe the tensors and MVM operations of the computation graph 220:

Matrix M(myModel, "M", 128, 128, initVector);
Matrix N(myModel, "N", 128, 128, initVector);
Matrix P(myModel, "P", 128, 128, initVector);
Vector X(myModel, "X", 128, initVector);
Vector Y(myModel, "Y", 128, initArray);

Vector Result=(M*(N*X))+(P*Y);

The MVM operations can be captured by the DPE DSL in a computation graph (e.g., 220) with each MVM operation represented as a subgraph with the MVM operation at the root of each respective subgraph and the operands of the MVM operation as nodes of the subgraph. The computation graph can be input to a DPE DSL compiler and transformed through various phases for final code generation. Constant matrices of the computation graph can be identified as weights for the neural network and loaded onto the DPE crossbars.

As shown in FIG. 2, the MVM operation on N and X is represented by the node 228, which is connected to the nodes 230 and 234. The MVM operation on M and the result of the MVM operation on N and X is represented by the node 224, which is connected to the nodes 226 and 228. The MVM operation on P and Y is represented by the node 236, which is connected to the nodes 238 and 240. The addition operation on the result of the MVM operation on M and the result of the MVM operation on N and X and the result of the MVM operation on P and Y is represented by the node 222, which is connected to the nodes 224 and 236.

An MVM operation that is dependent on the result of another MVM operation is directly linked to the other MVM operation in a computation graph. Directly linked MVM operation can be grouped together. In other words, an MVM operation that depends on the result of another MVM operation can both be placed in the same group. Such grouping of dependent MVM operations can enable a DPE DSL compiler to keep track of all the MVM operations that are dependent on another MVM operation so that the dependent MVM operations are co-located during code scheduling.

As shown in FIG. 2, the MVM operation represented by the node 224 is dependent on the result of the MVM operation represented by the node 228. Thus, the MVM operation represented by the node 228 and the MVM operation represented by the node 224 are both assigned to Group 0. The subgraphs 242 and 244 belong to Group 0. Note that the subgraph 242 includes the subgraph 244.

As shown in FIG. 2, the MVM operation represented by the node 236 is independent (e.g., does not have a direct dependency) of the result of the MVM operations represented by the nodes 224 and 228. Thus, the MVM operation represented by the node 236 is assigned to a different group, Group 1. The subgraph 246 belongs to Group 1.

Figure 3:
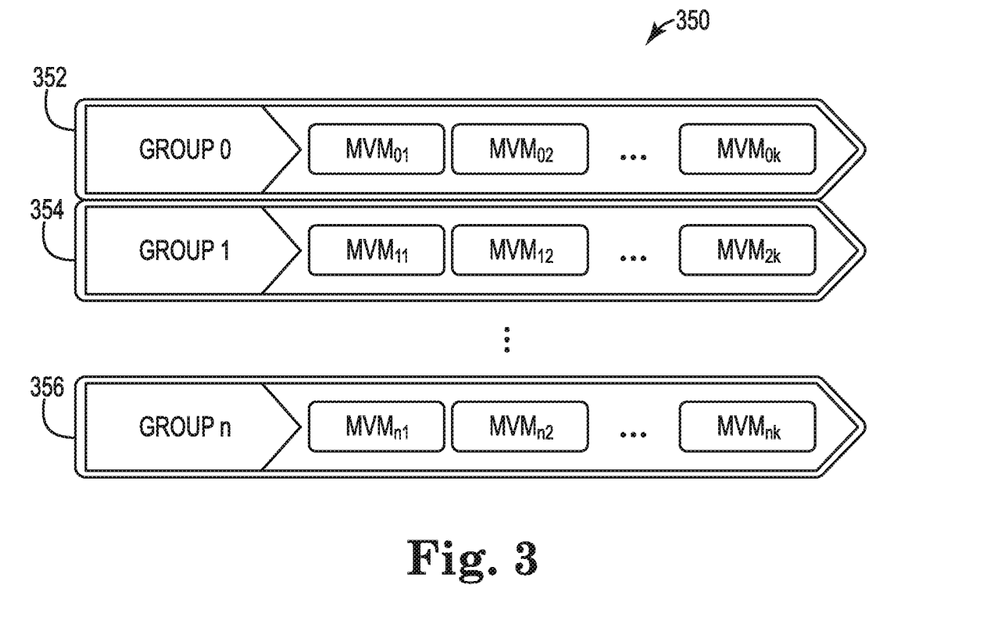
FIG. 3 illustrates an example list of MVM operations consistent with the disclosure.

FIG. 3 illustrates an example list 350 of MVM operations consistent with the disclosure. A DPE DSL compiler can create a list of the MVM operations per group. The list 350 can be used in subsequent phases of the DPE DSL compiler. As shown in FIG. 3, the list 350 can include a set of entries 352 of the MVM operations of Group 0 ($MVM_{01}$, $MVM_{02}$, . . . $MVM_{0k}$), a set of entries 354 of the MVM operations of Group 1 ($MVM_{11}$, $MVM_{12}$, . . . $MVM_{1k}$), and a set of entries 354 of the MVM operations of Group n ($MVM_{n1}$, $MVM_{n2}$, . . . $MVM_{nk}$). Although FIG. 3 illustrates each group including k−1 MVM operations, examples are not so limited. Groups can include different quantities of MVM operations. For example, referring back to the computation graph 220 illustrated in FIG. 2, the set of entries 352 would include the MVM operation represented by the node 228 (e.g., $MVM_{01}$) and the MVM operation represented by the node 224 (e.g., $MVM_{02}$). The set of entries 354 would include the MVM operation represented by the node 236 (e.g., $MVM_{11}$).

Figure 4:
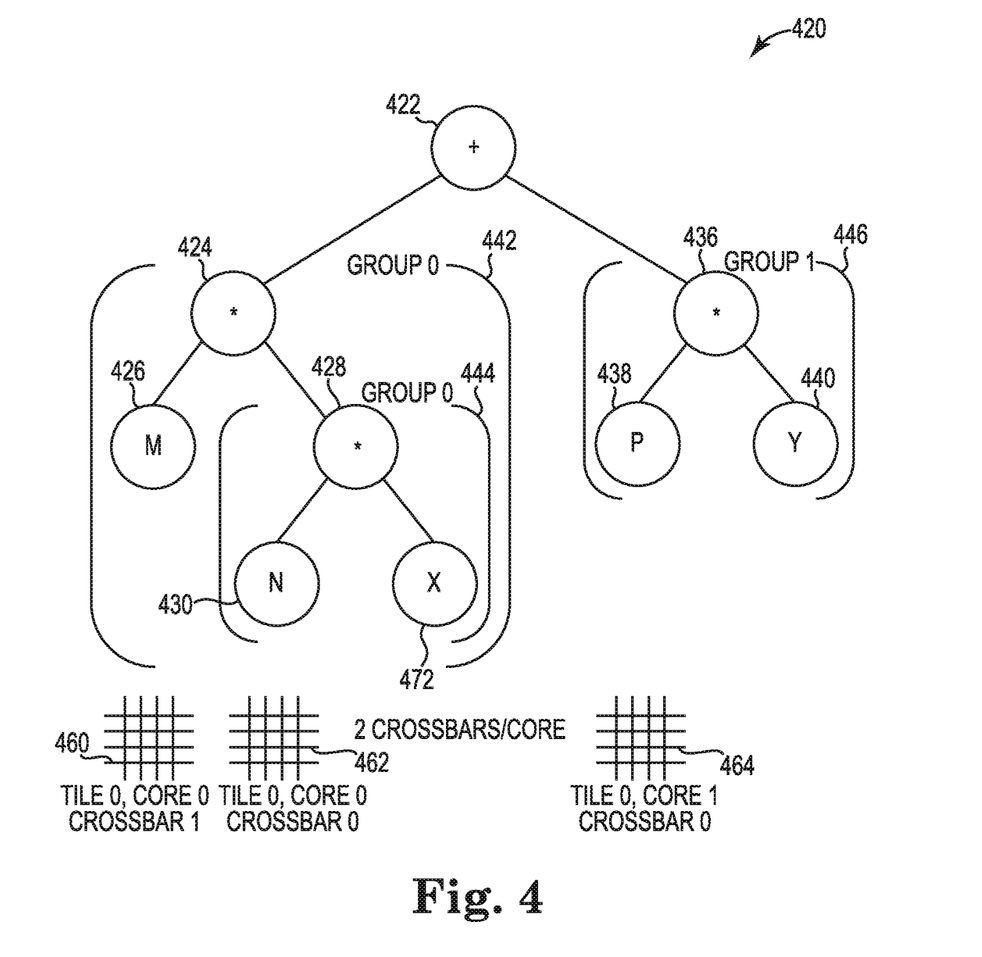
FIG. 4 illustrates example crossbar assignment according to the grouping of MVM operations of the computation graph of FIG. 2.

FIG. 4 illustrates example crossbar assignment according to the grouping of MVM operations of the computation graph 420. Subsequent to partitioning the computation graph 420 into a plurality of groups and subgraphs as described in association with FIG. 2 above, a DPE DSL compiler can perform a depth-first traversal (DFT) of the computation graph 420. The DPE DSL compiler can assign consecutive crossbars of a plurality of crossbars of a DPE (e.g., the crossbars 106 of the DPE 100 described in association with FIG. 1 above) to each matrix operand of the MVM operations encounter during the DFT. As used herein, "consecutive crossbars" refer to crossbars on the same core of DPE. However, consecutive crossbars do not necessarily have to be physically adjacent to one another on the same core. To co-locate dependent MVM operations, matrix operands belonging to the same group can be assigned (allocated) to consecutive crossbars. MVM operations that have a direct dependency can be assigned co-located crossbars. Weight matrices can be assigned to crossbars to maintain maximum co-location of dependent MVM operations. The following pseudocode is an example of an algorithm for crossbar assignment consistent with the disclosure:

Perform Depth-First Traversal (DFT) of compute graph
For each MVM encountered,
M<=Matrix operand of MVM
G<=Group that MVM belongs to
Assign next free crossbar (MVMU) to M
For each MVM belonging to group G,
   Assign next free crossbar to Matrix operand of MVM In the example of FIG. 4, each core (e.g., the cores 104) of the DPE has two crossbars. FIG. 4 illustrates an example outcome of the crossbar assignment algorithm described above. The MVM operation represented by the node 428 is assigned to the crossbar 462 (Crossbar 0 of Core 0 of Tile 0). The crossbar 462 can be analogous to the crossbar 106-1 of the core 104-1 of the tile 102-1 illustrated in FIG. 1. The MVM operation represented by the node 424 is assigned to the crossbar 460 (Crossbar 1 of Core 0 of Tile 0). Although not specifically illustrated in FIG. 1, the crossbar 462 can be analogous to the crossbar 106-2 of the core 104-1 of the tile 102-1. Because the MVM operations represented by the nodes 424 and 428 belong to the same group, Group 0, the matrices represented by the nodes 426 and 430 are assigned to consecutive crossbars 460 and 462.

In contrast, because the MVM operation represented by the node 436 belong to a different group, Group 1, the MVM operation represented by the node 436 is assigned to the crossbar 464 (Crossbar 0 of Core 1 of Tile 0). Although not specifically illustrated in FIG. 1, the crossbar 464 can be analogous to the crossbar 106-1 of the core 104-2 of the tile 102-1. The crossbar 464 is not consecutive to crossbar 460 or 462.

Figure 5:
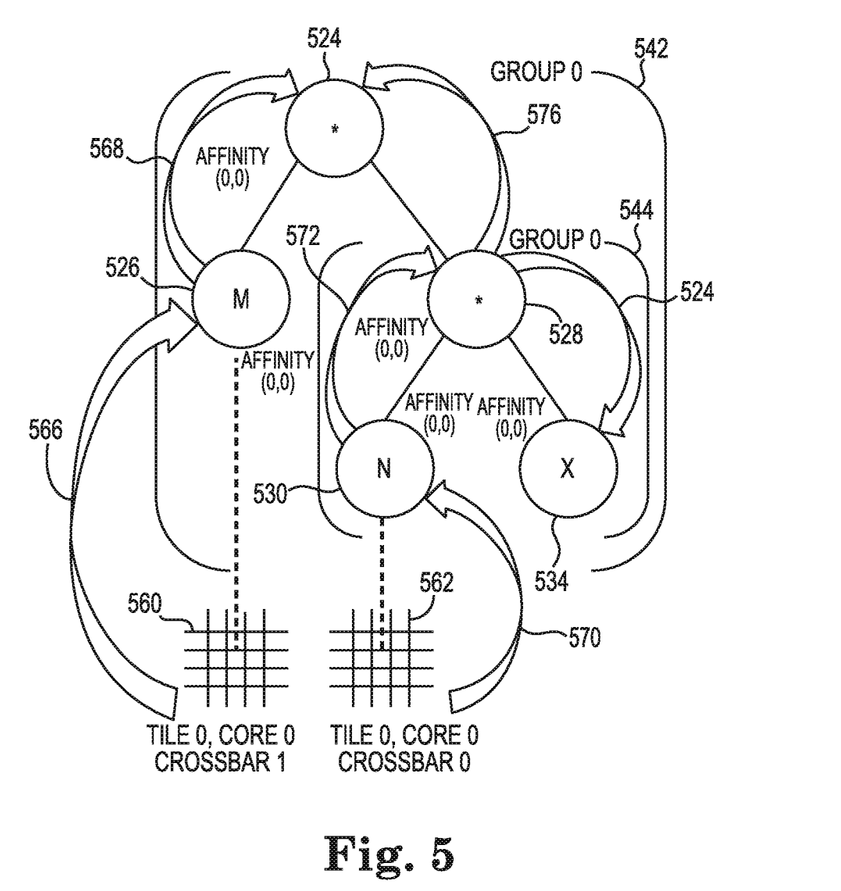
FIG. 5 illustrates example affinity propagation according to the grouping of MVM operations of a portion of the computation graph of FIG. 2.

FIG. 5 illustrates example affinity propagation according to the grouping of MVM operations of a portion of the computation graph 220 of FIG. 2. Subsequent to assigning weight matrices to crossbars, cores, and/or tiles of a DPE, the computation graph 220 needs to be partitioned accordingly to schedule dependent MVM operations on co-located crossbars, cores, and/or tiles. Co-locating dependent MVM operations can reduce costly data transfers across tiles and cores and reduce the quantity of instructions to be executed to execute a neural network.

To achieve improved placement of MVM operations on crossbars, cores, and tiles of a DPE, a DPE DSL compiler can use crossbar allocation information to assign an affinity to each dependent MVM operation. As used herein, "affinity" refers to which core of a DPE is to execute a particular set of instruction. In some examples, a DPE DSL compiler can perform a bottom-up traversal of a computation graph starting with an MVM operation. An affinity of an MVM operation can be initialized to a tuple (Tile, Core) including the tile identification number and the core identification number of the crossbar assigned to the matrix operand of the MVM operation. The affinity can then be propagated up through the computation graph.

FIG. 5 illustrates the subgraphs 542 and 544. The affinity of the matrix operand represented by the node 530 is initialized as (0,0) because it is assigned to Crossbar 0 of Core 0 of Tile 0) as indicated by the arrow 566. Similarly, the affinity of the matrix operand represented by the node 526 is initialized to (0,0) because it is assigned to Crossbar 1 of Core 0 of Tile 0) as indicated by the arrow 570. The affinity (0,0) is propagated up to the MVM operation represented by the node 524 from the node 526 as indicated by the arrow 568 and up to the MVM operation represented by the node 528 from the node 530 as indicated by the arrow 572. Then, the affinity (0,0) is propagated up to the MVM operation represented by the node 524 from the MVM operations represented by the nodes 526 and 528 as indicated by the arrows 568 and 576.

Because the initial affinity is seeded from the matrix operand of an MVM operation, a subgraph rooted at an MVM operation that does not have an associated MVM operation node may not have an affinity propagated up to it. Rather, the affinity of the parent MVM operation is propagated down to the subgraph. For example, as illustrated in FIG. 5, the subgraph 544 is rooted at the MVM operation represented by the node 528 that does not have an associated MVM operation (e.g., the MVM operation represented by the node 528 is performed on tensors M and X). Thus, the affinity (0,0) is propagated down the subgraph 544 to the tensor X represented by the node 534 as indicated by the arrow 524.

Figure 6:
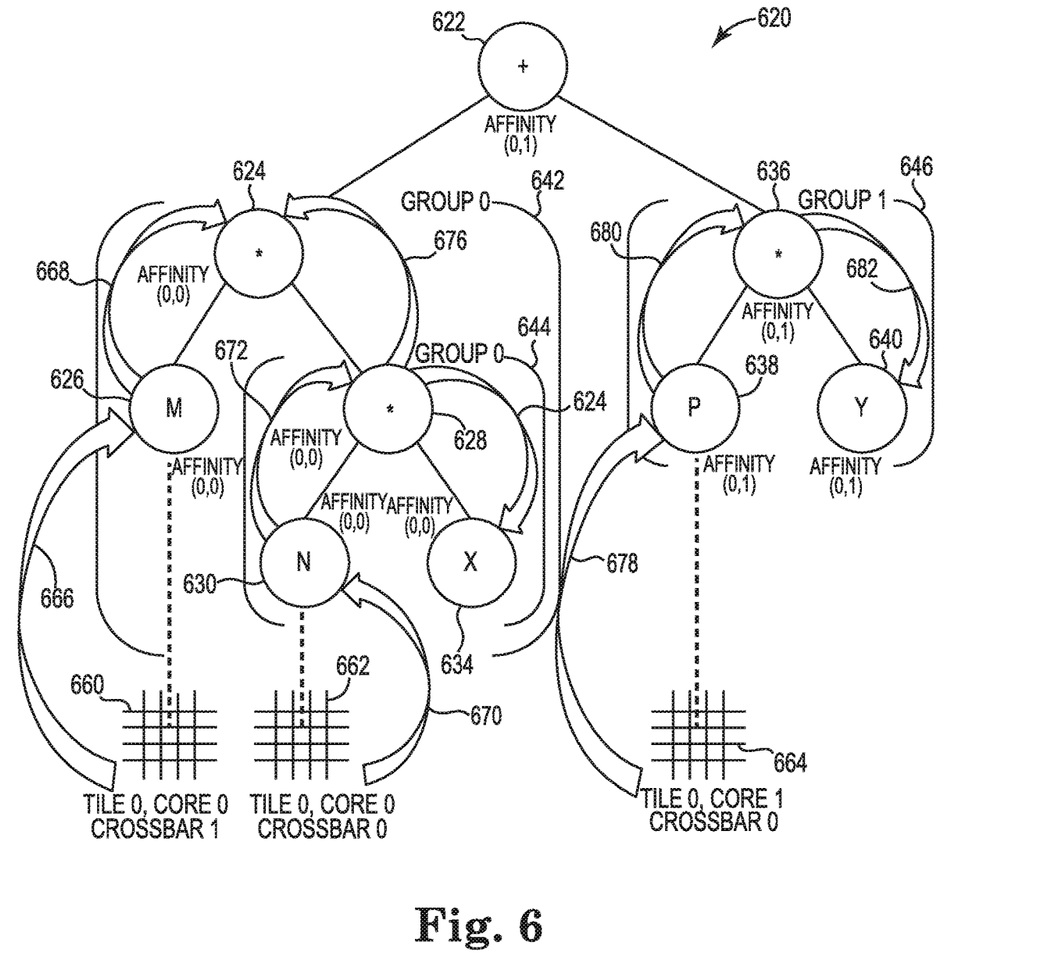
FIG. 6 illustrates example affinity propagation according to the grouping of MVM operations of the computation graph of FIG. 2.

FIG. 6 illustrates example affinity propagation according to the grouping of MVM operations of the computation graph 620. If a binary operation node of a computation graph receives two different affinities from the two subgraphs rooted at the operands of the binary operation, then the DPE DSL compiler can select one of the two affinities for the binary operation node. The selected affinity can then be propagated further up through the computation graph. An example of such a scenario is when the two operand subgraphs span across two different cores or tiles as a result of co-locating underlying dependent MVM operations. To select one of the two affinities (e.g., to decide which of the affinities to retain), the DPE DSL compiler can implement a scoring mechanism in which the affinity associated with the higher tile identification number is selected over the affinity associated with the lower tile identification number. If both affinities are associated with identical tile identification numbers, then the affinity associated with the higher core identification number is selected over the affinity associated with the lower core identification number. Because the execution of a neural network model can move to tiles and cores having sequentially increasing identification numbers, such a scoring mechanism can reduce data transfer across tiles and cores of a DPE.

FIG. 6 illustrates an example where the scoring mechanism described above is implemented. The binary operation node 622 of the computation graph 620 receives the affinity (0,0) from the subgraph 642 and the affinity (0,1) from the subgraph 646. According to the scoring mechanism the DPE DSL compiler can select the affinity associated with the higher core identification number. In the example of FIG. 6, the DPE DSL compiler selects the affinity (0,1) because it is associated with Core 1 of Tile 0 whereas the affinity (0,0) is associated with Core 0 of Tile 0.

Although FIGS. 2 and 4-6 illustrate computation graphs and subgraphs including MVM operations, examples consistent with the disclosure are not so limited. For example, computation graphs and subgraphs can include operations other than MVM operations (e.g., non-MVM operations). Non-limiting examples of a non-MVM operation can include addition of two vectors. For example, a vector resulting from an MVM operation can be added to another vector. The following are example expressions of non-MVM operations, where V1, V2, and V3 are vectors:

$$R1=(M*V1)+V2$$

$$R2=M*(V1+V2)$$

$$R3=(M*V1)+(V2+V3)$$

In a corresponding computation graph, M*V1 can be represented by an MVM operation node whereas (V2+V3) can be represented by a non-MVM operation node. Because (V2+V3) does not include a matrix, the affinity for the corresponding instruction can be propagated from the affinity assigned to the matrix M. If a non-MVM operation is dependent on the result of an MVM operation, then the non-MVM operation and the MVM operation can be grouped together and matrices of the non-MVM operation and the MVM operation can be assigned to consecutive crossbars. If an MVM operation is dependent on the result of a non-MVM operation, then the MVM operation and the non-MVM operation can be grouped together and matrices of the non-MVM operation and the MVM operation can be assigned to consecutive crossbars. If a non-MVM operation is dependent on the result of another non-MVM operation, then the non-MVM operations can be grouped together and matrices of the non-MVM operations can be assigned to consecutive crossbars.

Figure 7:
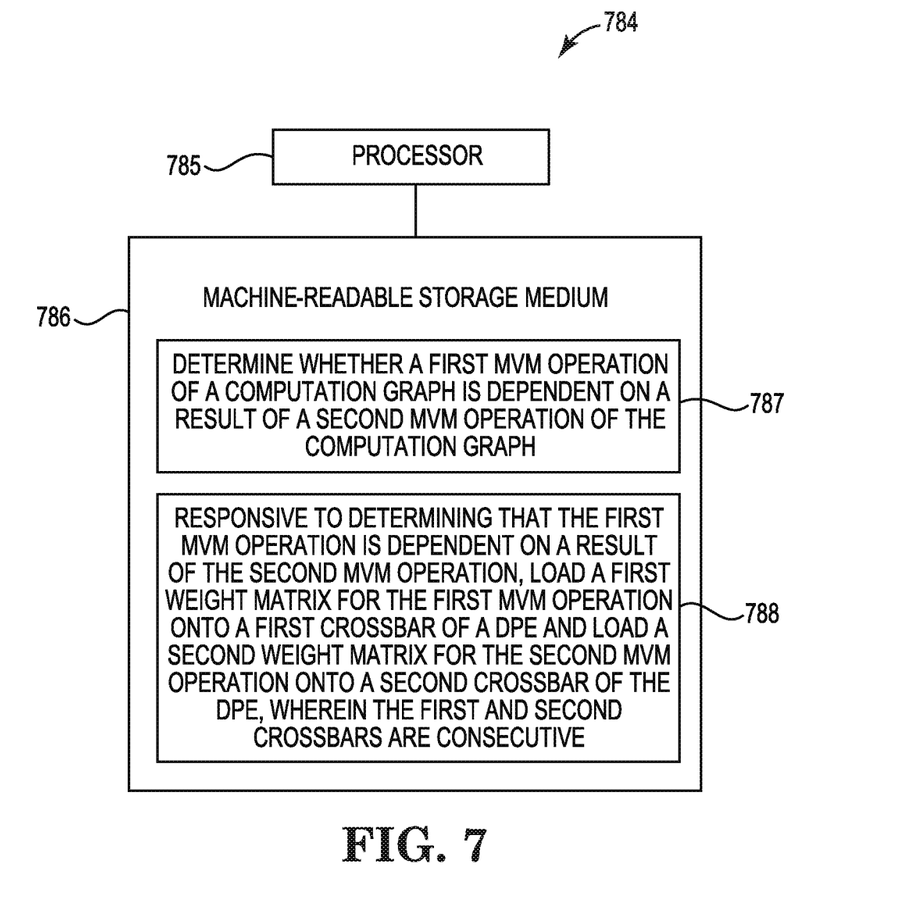
FIG. 7 is a block diagram of an example system consistent with the disclosure.

FIG. 7 is a block diagram of an example system 784 consistent with the disclosure. In the example of FIG. 7, the system 784 includes a processor 785 and a machine-readable storage medium 786. Although the following descriptions refer to a single processor and a single machine-readable storage medium, the descriptions may also apply to a system with multiple processors and multiple machine-readable storage mediums. In such examples, the instructions can be distributed across multiple machine-readable storage mediums and the instructions may be distributed across multiple processors. Put another way, the instructions can be stored across multiple machine-readable storage media and executed across multiple processors, such as in a distributed computing environment.

The processor 785 can be a CPU, a microprocessor, and/or other hardware device suitable for retrieval and execution of instructions stored in the machine-readable storage medium 786. In the particular example shown in FIG. 7, the processor 785 can receive, determine, and send instructions 787 and 788. As an alternative or in addition to retrieving and executing instructions, the processor 785 can include an electronic circuit comprising a number of electronic components for performing the operations of the instructions in the machine-readable storage medium 786. With respect to the executable instruction representations or boxes described and shown herein, it should be understood that part or all of the executable instructions and/or electronic circuits included within one box may be included in a different box shown in the figures or in a different box not shown.

The machine-readable storage medium 786 can be any electronic, magnetic, optical, or other physical storage device that stores executable instructions. Thus, the machine-readable storage medium 786 can be, for example, Random Access Memory (RAM), an Electrically-Erasable Programmable Read-Only Memory (EEPROM), a storage drive, an optical disc, and the like. The executable instructions can be "installed" on the system 784 illustrated in FIG. 7. The machine-readable storage medium 786 can be a portable, external or remote storage medium, for example, that allows the system 784 to download the instructions from the portable/external/remote storage medium. In this situation, the executable instructions can be part of an "installation package." As described herein, the machine-readable storage medium 786 can be encoded with executable instructions for assigning dependent MVM operations to consecutive crossbars of a DPE.

The instructions 787, when executed by a processor such as the processor 785, can cause the system 784 to determine whether a first MVM operation of a computation graph is dependent on a result of a second MVM operation of the computation graph.

The instructions 788, when executed by a processor such as the processor 785, can cause the system 784 to, responsive to determining that the first MVM operation is dependent on a result of the second MVM operation, load a first weight matrix for the first MVM operation onto a first crossbar of a DPE and load a second weight matrix for the second MVM operation onto a second crossbar of the DPE. The first and second crossbars can be consecutive.

Although not specifically illustrated in FIG. 7, the machine-readable storage medium 786 can include instructions, when executed by a processor such as the processor 785, can cause the system 784 to, responsive to determining that the first MVM operation is dependent on the result of the second MVM operation, obtain an affinity of a first operand of the first MVM operation, propagate the affinity up to an operand of the second MVM operation, and propagate the affinity down to a second operand of the first MVM operation.

Although not specifically illustrated in FIG. 7, the machine-readable storage medium 786 can include instructions, when executed by a processor such as the processor 785, can cause the system 784 to partition the computation graph into a plurality of subgraphs, wherein each node of a respective one of the subgraphs has a same affinity.

Figure 8:
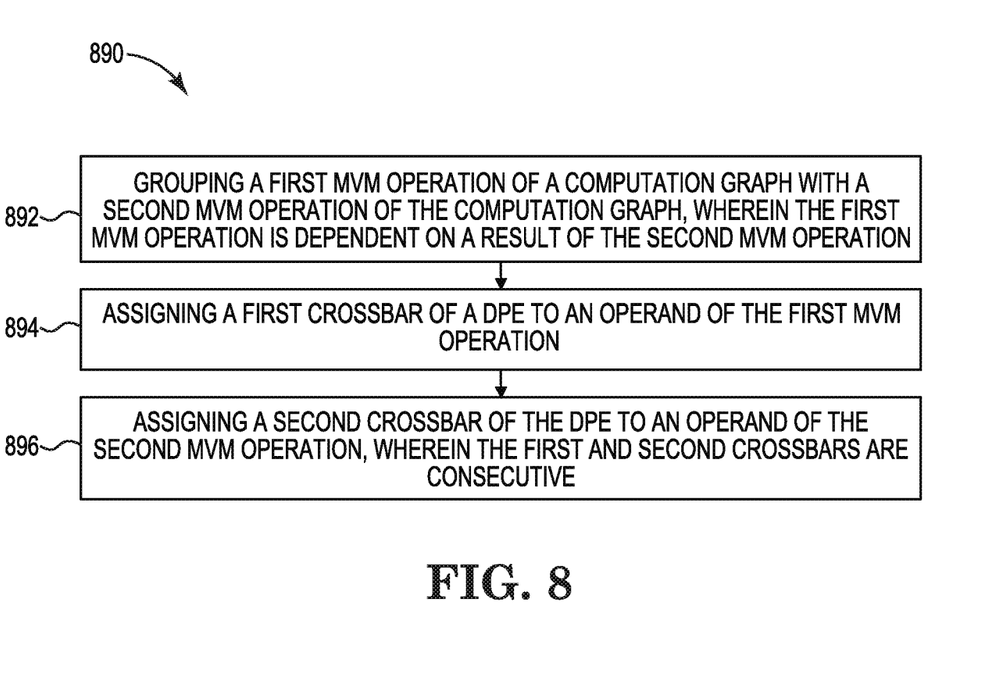
FIG. 8 illustrates an example method consistent with the disclosure.

FIG. 8 illustrates an example method 890 consistent with the disclosure. The method 890 can be performed, for example, using a DPE compiler. At 892, the method 890 can include grouping a first MVM operation of a computation graph with a second MVM operation of the computation graph, wherein the first MVM operation is dependent on a result of the second MVM operation.

At 894, the method 890 can include assigning a first crossbar of a DPE to an operand of the first MVM operation.

At 896, the method 890 can include assigning a second crossbar of the DPE to an operand of the second MVM operation, wherein the first and second crossbars are consecutive. The first and second crossbars can be on a same tile of the DPE. The first and second crossbars can be on a same core of the same tile.

Although not illustrated in FIG. 8, the method 890 can include loading a first weight matrix associated with the first MVM operation onto the first crossbar and loading a second weight matrix associated with the second MVM operation onto the second crossbar. The method 890 can include performing the first MVM operation on the first weight matrix using the first crossbar and performing the second MVM operation on the second weight matrix using the second crossbar.

Although not illustrated in FIG. 8, the method 890 can include propagating an affinity according to the grouping of the first and second MVM operations.

Although not illustrated in FIG. 8, the method 890 can include excluding a third MVM operation from the grouping of the first and second MVM operations in response to the third MVM operation being independent of a result of the first MVM operation and the result of the second MVM operation.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 224 may reference element "24" in FIG. 2, and a similar element may be referenced as 424 in FIG. 4. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure and should not be taken in a limiting sense.

What is claimed:

1. A method, comprising:
grouping a first matrix-vector multiplication (MVM) operation of a computation graph with a second MVM operation of the computation graph, wherein the first MVM operation is dependent on a result of the second MVM operation;
assigning a first crossbar of a dot product engine (DPE) to an operand of the first MVM operation; and
assigning a second crossbar of the DPE to an operand of the second MVM operation, wherein the first and second crossbars are consecutive.

2. The method of claim 1, wherein the first and second crossbars are on a same tile of the DPE.

3. The method of claim 2, wherein the first and second crossbars are on a same core of the same tile.

4. The method of claim 1, further comprising:
loading a first weight matrix associated with the first MVM operation onto the first crossbar; and
loading a second weight matrix associated with the second MVM operation onto the second crossbar.

5. The method of claim 4, further comprising:
performing the first MVM operation on the first weight matrix using the first crossbar; and
performing the second MVM operation on the second weight matrix using the second crossbar.

6. The method of claim 1, further comprising propagating an affinity according to the grouping of the first and second MVM operations.

7. The method of claim 1, further comprising excluding a third MVM operation from the grouping of the first and second MVM operations in response to the third MVM operation being independent of a result of the first MVM operation and the result of the second MVM operation.

8. A non-transitory processor readable medium, comprising machine executable instructions that, when executed by a processor, cause the processor to:
determine whether a first matrix-vector multiplication (MVM) operation of a computation graph is dependent on a result of a second MVM operation of the computation graph; and
responsive to determining that the first MVM operation is dependent on a result of the second MVM operation:
load a first weight matrix for the first MVM operation onto a first crossbar of a dot product engine (DPE); and
load a second weight matrix for the second MVM operation onto a second crossbar of the DPE, wherein the first and second crossbars are consecutive.

9. The non-transitory processor readable medium of claim 8, further comprising machine executable instructions that, when executed by the processor, cause the processor to, responsive to determining that the first MVM operation is dependent on the result of the second MVM operation:
obtain an affinity of a first operand of the first MVM operation;
propagate the affinity up to an operand of the second MVM operation; and
propagate the affinity down to a second operand of the first MVM operation.

10. The non-transitory processor readable medium of claim 8, further comprising machine executable instructions that, when executed by the processor, cause the processor to partition the computation graph into a plurality of subgraphs, wherein each node of a respective one of the subgraphs has a same affinity.

11. A system, comprising:
a dot product engine (DPE) compiler to:
group operands of a first matrix-vector multiplication (MVM) operation with operands of a second MVM operation in a first group in response to the first MVM operation being dependent on a result of the second MVM operation; and
group operands of a third MVM in a second group, separate and distinct from the first group, in response to the third MVM operation being independent of a result of the first MVM operation and the result of the second MVM operation; and
a DPE including a plurality of crossbars and to load a plurality of weight matrices onto the plurality of crossbars according to the grouping of the operands.

12. The system of claim 11, wherein:
the DPE compiler is to generate a list of groups, including the first and second groups; and
the list of groups indicates to which one of a plurality of groups, including the first and second groups, each respective one of a plurality of MVM operations, including the first and second MVM operations belong.

13. The system of claim 12, wherein the DPE compiler is to:
perform a depth-first traversal (DFT) of a computation graph of the plurality of MVM operations; and
assign consecutive crossbars of the DPE to operands of the plurality of MVM operations of each respective one of the plurality of groups.

14. The system of claim 13, wherein:
the DPE compiler is to partition a computation graph of the plurality of MVM operations into a plurality of subgraphs,
each subgraph is associated with each respective one of the plurality of groups.

15. The system of claim 12, wherein the DPE compiler is to, for each respective one of the plurality of groups:
initialize an affinity of one operand of one MVM operation to a tuple of a corresponding one of the plurality of crossbars; and
propagate the affinity throughout the group.

16. The system of claim 15, wherein the DPE is to perform the plurality of MVM operations, according to the propagated affinity of each respective one of the plurality of groups, on the plurality of weight matrices using the plurality of crossbars.

17. The system of claim 15, wherein:
the tuple includes a tile identification number and a core identification number of the corresponding one of the plurality of crossbars; and
the DPE compiler is to select one of two different affinities received by a binary operation node of a computation graph of the plurality of MVM operations based on the tile identification number or the core identification number.

18. The system of claim 17, wherein the DPE compiler is to select the one of the two different affinities having a higher tile identification number.

19. The system of claim 18, wherein the DPE compiler is to, responsive to the two different affinities having a same tile identification number, select the one of the two different affinities having a higher core identification number.

20. The system of claim 11, wherein the DPE compiler is to compile a program describing a neural network in a domain specific programming language (DSL).

* * * * *